United States Patent Office 3,445,242
Patented May 20, 1969

3,445,242
GELATIN DESSERT MIX TABLET AND PROCESS
Robert William McDonnell, West Englewood, and Bernard Richard Schaafsma, Chatham, N.J., assignors to Colgate-Palmolive Company, New York, N.Y., a corporation of Delaware
No Drawing. Filed Oct. 21, 1965, Ser. No. 500,158
Int. Cl. A23j 1/00, 3/00
U.S. Cl. 99—130                    8 Claims

ABSTRACT OF THE DISCLOSURE

A readily soluble, breakage resistant gelatin dessert mix tablet having an inner core of compressed gelatin dessert mix granules with a moisture content of 1.8 to 3.5% by weight and a hardened outer coating of compressed gelatin dessert mix, produced by (a) adding water to powdered gelatin dessert mix to adjust the moisture content thereof to 1.8 to 3.5%, thereby rendering said powder sticky and causing agglomeration into granules; (b) compressing the moistened mixture at a pressure of 200 to 1200 p.s.i.g.; (c) moistening the surface of the compressed tablet with water and (d) drying the moistened, compressed tablet to remove water to form a surface-hardened tablet.

---

This invention relates to gelatin desserts and more particularly to such desserts in tablet or wafer form. Specifically, this invention relates to a new and useful method for formation of compacted gelatin desserts which are easily soluble but do not tend to crumble or disintegrate during normal packaging and handling processes.

The use of gelatin desserts has for many years provided the housewife a quick and satisfactory method for eliminating the drudgery of complex dessert preparation. However, the gelatin industry has for a large number of years attempted to simplify the basic technique of utilization of these compositions by providing individual serving packets or compressed tablets containing only sufficient quantities for such servings. The former technique has not met with success.

It has been proposed to form gelatin dessert tablets from gelatin dessert mixes containing substantial quantities of water, for example 5 percent by weight and more. However, when such mixes are compressed into tablet form, it is necessary thereafter to remove a substantial quantity of water in order to provide tablets suitably dry for use.

Not to be confused with such gelatin dessert tablets and the novel gelatin dessert tablets of this invention, are methods for tableting of gelatin powder per se. In such methods, pressures of the order of 20,000 to 30,000 pounds per square inch are used.

The present invention involves a method to produce a gelatin dessert tablet which will not flake or chip during normal handling and which will dissolve at substantially the same rate as the standard powdery mixes when placed in hot water. The method is one in which excessive tableting pressures and special manufacturing equipment are not required. In addition, the method is advantageous in that sepcial binders or other additional ingredients not found in the standard powdered gelatin dessert mixes, are not required. And the invention advantageously makes possible gelatin dessert tablets of such size as to easily form with hot water only a single serving, or multiple servings, as desired.

Accordingly, the invention involves a method comprising:

(a) adding water to a powdered gelatin dessert mix to bring the moisture content thereof to from about 1.8 to about 3.5 percent by weight, and preferably from about 2.5 to about 3 percent by weight;

(b) pressing the moistened gelatin dessert mix of (a) into tablet form with a pressure of from about 200 to about 1,200 pounds gauge (p.s.i.g.), and preferably from about 500 to about 1000 p.s.i.g.;

(c) moistening the surface of the tablet formed in (b), whereupon the surface thereof is hardened; and (d) drying the surface-hardened tablet formed in (c), thereby removing water therefrom.

A novel tablet contemplated herein is a gelatin dessert tablet comprising an inner core containing a compressed gelatin dessert having a moisture content of from about 1.8 to about 3.5 percent by weight and a hardened outer coating.

As indicated above, a powdered gelatin dessert mix is used herein. Such products are well known in the art as comprising gelatin having a moisture content below about 20 percent by weight, sugar, fruit acid, flavoring, color and miscellaneous ingredients. Such powdered gelatin desserts have a moisture content of up to about 1.5.

Efforts to tablet powdered gelatin desserts of the foregoing character have been unrewarding, the powder being deficient in binding properties. Further, if sufficient pressure to form a strong tablet is used, the tablet is not readily dissolved. However, in accordance with the present invention, it has been found that the powdered materials can be modified for pressing into satisfactory tablets. Modification is accomplished by increasing the moisture content of the powdered materials to a critical range, whereupon the modified powders are converted into suitable form for pressing.

Powdered gelatin dessert is subjected to a water atmosphere to bring the moisture content to between about 1.8 and about 3.5 percent by weight. It has been found that amounts below 1.8 percent will result in a tablet which will flake or chip even after following treatment in the present method, while amounts over about 3.5 percent will cause the formation of a relatively sticky composition which will be too wet to be fed into tablet dies. The optimum range of water content for the above purposes has been found to be from about 2.5 to about 3 percent, while amounts of about 2.7 percent in this range have been found to be most satisfactory for industry-provided powdered premixes. It has been observed that the mixture of water and gelatin dessert becomes somewhat sticky, particles agglomerate, the density of the mix decreases and the average particle size increases.

The moisture can be added by merely spraying the particles, as by spraying a powder held in a tumbling drum or on a moving belt, by subjecting a powder to steam, or by exposing a powder to high relative humidity at a slightly elevated temperature. Even distribution of moisture can be readily accomplished by utilizing a 90/90 oven (90° F./90% relative humidity). As contemplated herein, moisture can be added by one or a combination of such techniques.

Moistening of gelatin dessert powder increases the particle size of the gelatin charge and changes the character thereof such that it can be pressed advantageously in the new method. Particle sizes of the gelatin charge and of the moistened gelatin material are illustrated below:

SCREEN ANALYSIS OF "JELLO" (trademarked product AS TAKEN FROM PACKAGE
(Density 0.785 gm./cc.)

| U.S. Screen No.: | Percent retained on screen |
|---|---|
| 10 | 0 |
| 20 | 0 |
| 40 | 7.9 |
| 60 | 64.2 |
| 80 | 21.2 |

| U.S. Screen No.:—Continued | Percent retained on screen |
|---|---|
| 100 | 2.9 |
| Pan | 3.8 |

SAME MATERIAL AFTER ADDING WATER AND DRYING ABOUT 16 HOURS (Density 0.471 gm./cc.)

| U.S. Screen No.: | Percent retained on screen |
|---|---|
| 10 | 0.4 |
| 20 | 9.7 |
| 40 | 52.4 |
| 60 | 32.7 |
| 80 | 4.5 |
| 100 | 0.2 |
| Pan | 0.1 |

The following operation, pressing, can be carried out in a standard hand or continuous press with a relatively low pressure of from about 200 to about 1,200 p.s.i.g. By carrying out this pressing under such low pressures there is a very low incidence of tablet imperfection while still forming a compact mass of sufficient strength to meet the above objects. Further, by utilization of low pressures the expense of high pressure equipment is obviated. The pressing step is advantageously conducted within several hours, as within four hours, after moistening of the powder.

In view of normal handling and packaging techniques, it is desirable to moisten the surface of the compressed tablet. It has been found that water acts upon the gelatin and/or sugar present in the tablet to form a hardened outer surface, in a sense a "case hardening" of the tablet surface. The hardened surface renders the product chip- and flake-proof even after severe handling, without affecting its solubility in hot water. Not only is the surface case hardened, but the interior of the tablet is strengthened. The amount of water contacted with the tablet surface is sufficient to form the coating without substantially impregnating the core of the pressed tablet.

Moistening of the tablet surface can be accomplished by: spraying water on a tablet; subjecting a tablet to wet steam for a suitable time interval; etc. Of such treatments, water spray is particularly advantageous and is preferred. It is contemplated, however, to use one or a combination of such treaments to moisten the surface of a tablet.

Air drying of a surface-moistened tablet results in the setting of the surface and thereby provides an ultimate product meeting all of the desideratum. The drying can be accomplished by hot or cool air although it is desirable that the drying be conducted in hot air to minimize drying time. Optimum drying has been found to be effected by a dehumidified warm air stream of about 120 to 150° C. for about 20 minutes.

The present invention is illustrated further by the following examples. It is to be understood, however, that the invention is not to be limited to the specific materials or conditions set forth in the examples. All quantities are expressed in parts by weight unless otherwise indicated.

Example I 200 grams of a commercial gelatin dessert (orange flavor) was used. This had the particle size indicated above, i.e., with approximately 85 percent retained on U.S. Screen Nos. 60 and 80. The dessert used in this and the following examples had the following composition:

| | Percent by weight |
|---|---|
| Sugar | 90.8 |
| Gelatin | 4.0 |
| Adipic acid | 3.5 |
| Sodium citrate | 1.25 |
| Natural and certified flavors | 0.1 |
| Butylated hydroxy anisole (2,6,di-t-butyl-4 methoxyphenol | 0.01 |
| Volatile material (composed mainly of $H_2O$ and some flavoring) | Balance |

This mixture was placed in an oven wherein the relative humidity was maintained at 90% with the oven temperature at 80% F. until the moisture content of the mixture reached 3.0 percent by weight (2 hours.) The composition was then removed and tableted in a standard 1½ inch hand press under 1,000 p.s.i.g. The four resultant tablets each weighed 42 grams and immediately after pressing were subjected to a fine water mist spray for several seconds until an even coating was observed. The tablets were then air dried in a warm, dry oven.

In one experiment involving the sequence described above, it was found that the tablets following drying had a moisture content in the range of about 1.8 to 3.5 percent by weight.

The final tablets were found not to be subject to chipping or cracking. They were crushed with compression pressures of about 40 p.s.i.g. A series of wrappings and unwrappings in "cellophane" produced negligible surface chipping. Upon completion of the handling tests the tablets were placed in hot water where they were completely dissolved within one minute and, after cooling in a mold, provided one serving of gelatin dessert of identical flavor to that produced from the powdered mix.

Example II

In the same manner as in Example I, 200 grams of a commercial powdered strawberry gelatin was used. It, too, had the same approximate particle size and moisture content as the charge material of Example I. It was then moistened by water spraying to a moisture content of 2.8 percent. Tableting, moisture coating and air drying were accomplished as in Example I, and the resultant product showed low chipping and flaking and withstood pressures over 40 p.s.i.g. The tablets dissolved readily in hot water.

Example III

A gelatin sample as in Example II was processed in an identical manner as in Example I except that the step of moistening before tableting was omitted. The resultant tablets before spraying crushed easily and were chipped during normal handling. After coating they were less subject to chipping but were easily crushed under less than 30 p.s.i.g.

Another sample as in Example II was moistened to a 1.4 percent water content, in the oven mentioned in Example I, and was tabletted as in Example I. The tablet was weak, such that it readily broke apart when handled normally.

The gelatin dessert to which this invention relates has a Bloom strength of preferably about 30 to 50 and more preferably from about 40 to 50. The Bloom strength is measured using the Bloom gelometer which measures the force, in grams, necessary to push a blunt instrument a distance of 4 mm. into a gel.

A large number of powdered gelatin desserts were investigated. No claim is made to any specific powdered gelatin composition. Such compositions are well known to the art and are described in numerous United States patents. These compositions include numerous flavors such as orange, strawberry, lime, raspberry, etc. as well as other ingredients and the optimum amount of moisture content should be determined for each composition. As pointed out above, about 2.7% has been found to be about optimum for all of the compositions prepared. Since some gelatin desserts contain less sugar than others it is within the scope of this invention to add additional sugar during either the first moistening step of the coating operation.

It is to be understood that optimum results will be achieved with different moisture contents in moistening a gelatin dessert mix within the range of from about 1.8 to about 3.5 percent by weight, depending upon the amount of water, of sugar or other ingredients present in the mix used.

It will be appreciated that various known equivalents may be substituted for the above listed illustrative components of the gelatin dessert. For example, in lieu of adipic acid, other acidulating agents such as citric, lactic, tartaric, phosphoric and fumaric acid may be employed to regulate the pH, taste and tartness of the product. In lieu of sodium citrate, other buffers such as sodium tartarate, and mixtures of mono and disodium phosphate may be employed. The sweetening agent may be any of the saccharines, or sugars such as sucrose, glucose, levulose, lactose, frustose, maltose, and mixtures thereof. The gelatin may be any of the known gelatins. Other suitable antioxidants in addition to butylated hydroxy anisole include butylated hydroxy toluene, propyl gallate and the like.

While only certain forms of the invention have been described herein, it will be readily apparent to those skilled in the art that many minor modifications may be made without departing from the spirit of the invention or the scope of the appended claims.

What is claimed is:

1. The method of preparing an easily soluble, strong, chip-proof gelatin dessert tablet, comprising:
   (a) adding sufficient water to a powdered gelatin dessert mix containing up to about 1.5% by weight of water to increase the moisture content thereof to from about 1.8 to about 3.5 percent by weight, thereby rendering the surface of said powder sticky and causing agglomeration into granules;
   (b) pressing the moistened gelatin dessert mix formed in (a) at a pressure from about 200 to about 1,200 pounds per square inch into tablet form;
   (c) moistening the surface of the tablet formed in (b) with water; and
   (d) drying the surface-moistened tablet in (c) to remove water from said surface to form a hardened outer surface.

2. The method defined by claim 1 wherein the moisture content is increased to from about 2.5 to about 3 percent by weight in (a).

3. The method defined by claim 1 wherein the moisture content is increased in (a) by use of an atmosphere having a relative humidity of at least about 90 percent and a temperature of about 90° F.

4. The method defined by claim 1 wherein the moisture content is increased in (a) by use of a water spray.

5. The method defined by claim 1 wherein the particle size of a major portion of the moistened gelatin dessert mix recited in (a) is such as to be retained on U.S. Screen numbers 40 and 60.

6. The method defined by claim 1 wherein the pressure in (b) is from about 500 to about 1,000 pounds per square inch.

7. The method defined by claim 1 wherein the surface of the tablet is moistened in (c) by exposure to wet steam.

8. The method defined by claim 1 wherein the surface of the tablet is moistened in (c) by spraying with water.

References Cited

UNITED STATES PATENTS

| | | | |
|---|---|---|---|
| 1,613,362 | 1/1927 | Sheppard et al. | 260—117 |
| 1,770,573 | 7/1930 | Haavardsholm | 99—130 X |
| 1,896,049 | 1/1933 | Zeigler | 99—130 |

OTHER REFERENCES

Little: "Tablet Making" 1963, The Northern Publishing Co., Ltd., Liverpool, England, p. 18 (copy in Group 170).

"Remington's Practice of Pharmacy": 11th ed., 1956, Mack Publishing Co., Easton, Pa., p. 376 (copy in Group 120).

A. LOUIS MONACELL, *Primary Examiner.*

J. M. HUNTER, *Assistant Examiner.*

U.S. Cl. X.R.

99—139